(12) United States Patent
Lenk

(10) Patent No.: US 6,904,821 B2
(45) Date of Patent: Jun. 14, 2005

(54) LEVEL MEASURING INSTRUMENT AND PROCEDURE FOR ITS INSERTING INTO A CONTAINER

(75) Inventor: Fritz Lenk, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/727,809

(22) Filed: Dec. 4, 2003

(65) Prior Publication Data

US 2004/0200276 A1 Oct. 14, 2004

(30) Foreign Application Priority Data

Jan. 17, 2003 (DE) .......................................... 103 01 863

(51) Int. Cl.[7] .............................................. G01D 21/00
(52) U.S. Cl. .................................................... 73/866.5
(58) Field of Search ............................ 73/866.5, 290 R

(56) References Cited

U.S. PATENT DOCUMENTS

| | | | | | |
|---|---|---|---|---|---|
| 4,465,088 | A | * | 8/1984 | Vosper | 137/1 |
| 4,507,521 | A | * | 3/1985 | Goellner | 174/151 |
| 4,574,328 | A | * | 3/1986 | Maier | 361/284 |
| 5,272,921 | A | * | 12/1993 | Foller et al. | 73/304 R |
| 5,737,963 | A | * | 4/1998 | Eckert et al. | 73/290 V |
| 5,955,684 | A | * | 9/1999 | Gravel et al. | 73/866.5 |
| 6,062,095 | A | * | 5/2000 | Mulrooney et al. | 73/866.5 |
| 6,118,282 | A | * | 9/2000 | Grieger | 324/637 |
| 6,750,657 | B2 | * | 6/2004 | Griessbaum et al. | 324/642 |
| 2004/0168530 | A1 | * | 9/2004 | Adolfs et al. | 73/866.5 |

FOREIGN PATENT DOCUMENTS

| | | | |
|---|---|---|---|
| DE | 41 18 715 | 12/1992 | ........... G01D/11/30 |
| DE | 100 45 235 | 3/2002 | ........... G01F/23/00 |
| DE | 102 06 110 | 8/2003 | ........... G01F/23/28 |
| EP | 875738 A1 | * 11/1998 | ......... G01F/23/284 |

* cited by examiner

*Primary Examiner*—Hezron Williams
*Assistant Examiner*—John Fitzgerald
(74) *Attorney, Agent, or Firm*—Nath & Associates PLLC; Gregory B. Kang; Derek Richmond

(57) ABSTRACT

A filling level measurement device and a process for its insertion into a tank. The tank has a passage opening leading from the outside of the tank through the tank wall to the inside of the tank, and the filling level measurement device is introduced into the passage opening from the outside of the tank, and a seal is introduced between the wall of the tank and the filling level measurement device. By the nature of the seal, a smooth surface is maintained on the inside of the tank for simplified cleaning. Specifically, an opening wall that protrudes into the passage opening, tapers the passage opening toward the inside of the tank. The filling level measurement device is introduced in the lateral direction from the opening wall, protruding into passage opening, with a clearance area around the opening wall. A dog fashioned on the circumference of the filling level measurement device presses the seal in the direction of the inside of the tank, against the protruding opening wall, and into the clearance area.

9 Claims, 4 Drawing Sheets

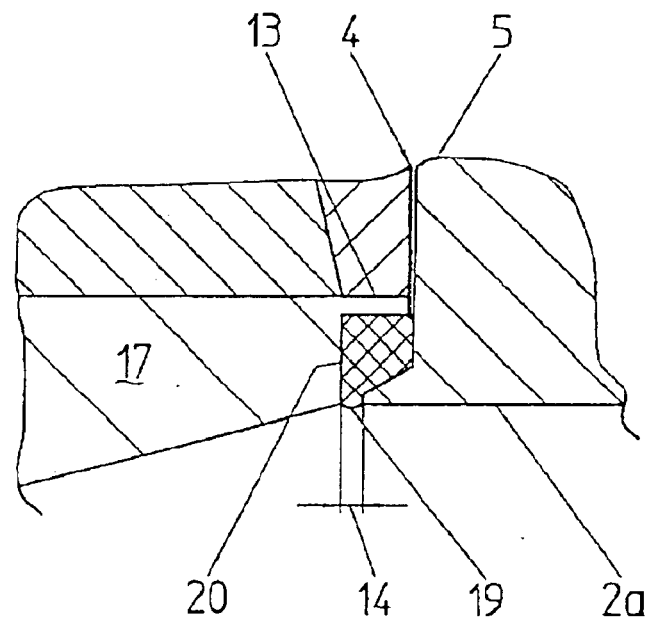
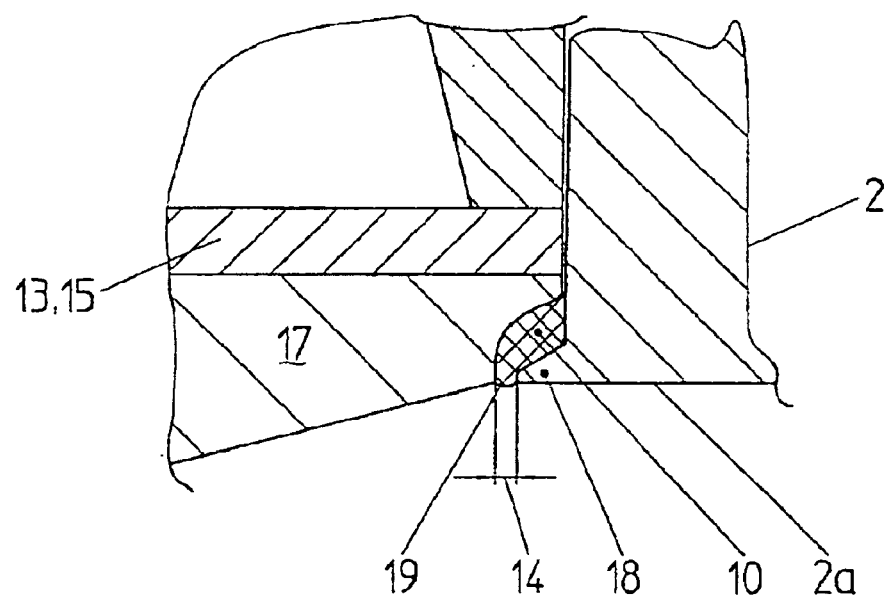

US 6,904,821 B2

LEVEL MEASURING INSTRUMENT AND PROCEDURE FOR ITS INSERTING INTO A CONTAINER

CROSS REFERENCE TO RELATED APPLICATIONS

This application claims foreign priority under 35 U.S.C. §119 to German Patent Application Serial No. 103 01 863.8 filed Jan. 17, 2003, the entirety of which is hereby incorporated by reference herein.

FIELD OF THE INVENTION

The invention relates to sealing a filling level measurement device to a tank.

BACKGROUND OF THE INVENTION

For the purpose of measuring the filling level of a filling medium in a tank, radar filling level measurement devices are generally known. Such radar filling level measurement devices have antenna adjustment systems with horn or rod antennas, which protrude into the tank. The tank has flange connectors, clamping connectors, or threaded pipe connectors, which protrude, in part, from the tank, for the purpose of accommodating a radar filling level measurement device.

The combination of a radar measurement device and such a flange or connector on the tank is not suitable for use in a sterile environment, however, since residues of the filling material, which find their way into the area of the connector on the tank and onto the antenna, or onto other components of the radar measurement device, are not sufficiently accessible for cleaning. Also, in particular, cleaning the antenna components is not possible in the case of such an arrangement in the assembled state, because the seal between the antenna protruding into the tank and the tank's connector is not sufficiently smooth.

It is therefore an object of the invention to improve the connection of the filling level measurement device and the tank such that after the assembly of the filling level measurement device and the tank, better cleaning is possible and, in particular, use is possible even in sterile areas, and to identify a corresponding processing method for assembling a filling level measurement device and a tank, respectively.

SUMMARY OF THE INVENTION

The objects are achieved by means of a process for introducing a filling level measurement device into a tank, a filling level measurement device for use in this process, and a tank opening for receiving a filling level measurement device in accord with this process. Corresponding combined arrangements comprising such a tank and such a filling level measurement device are particularly advantageous.

A particularly good seal of the transition between the built-in filling level measurement device and the adjacent inner wall of the tank results by virtue of the fact that a portion of a sealing element is pressed into a lateral clearance area found between the two. When introducing the filling level measurement device, the sealing element is pressed by a dog on the filling level measurement device in the direction of the tank's interior, for purposes of inward pressing deformation. The passage opening into which the filling level measurement device is introduced tapers toward the inside of the tank, thus constituting an abutment for the sealing element. By virtue of such an arrangement and a corresponding assembly, a portion of the seal is pressed into the interstitial space or clearance area between the inside of the passage opening and the external circumference of the filling level measurement device. This portion of the seal, which is deformed when pressed into the clearance area, causes a lateral gripping of the filling level measurement device within the passage opening, i.e. in the direction of a plane substantially perpendicular to the direction of installation of the filling level measurement device, which is gripped in the area of installation by the inside of the tank. In addition, the seal effects a sealing barrier that prevents portions of the filling medium from penetrating into the clearance area. A surface that is substantially smooth or free of discontinuities results, running from the interior of the tank via the portions of the seal that are pressed into the clearance area to the inside surface of the filling level measurement device, which is fashioned, for example, as an antenna cone of a radar filling level measurement device. In addition to preventing the filling medium from penetrating into fissures, scratches, or the like, or even into the inner area of the filling connector and the filling level measurement device itself, cleaning is also thus facilitated, given such an arrangement. It must be emphasized, in addition, that as a result of this arrangement, a particularly stable bracing of the filling level measurement device is rendered possible within the tank's passage opening.

The described arrangement and mode of assembly enables the use of common commercial sealing elements, especially seals in the form of an O-ring, to the extent that the latter satisfy the corresponding hygiene provisions and the provisions regarding chemical resistance in light of the planned filling media. The use of specially shaped seals is no longer necessary, which is advantageous. Other advantages are also achieved.

Advantageously, the seal is pressed into the clearance area in such a manner that it not only protrudes into the clearance area, but partially bulges through the latter into the interior space of the tank. Indeed, this causes quite a smooth transition between the inside of the tank and the inside surface of the tank of the filling level measurement device, but is particularly certain to prevent parts of the filling medium from penetrating into a fissure that might possibly remain in the clearance area. In addition, it is assured that in the entire clearance area, i.e. in as large a volume area as possible, a portion of the sealing element between the inside tank wall or the wall of the passage opening and the outer wall of the filling level measuring device serves to provide improved stabilization.

As noted, the passage opening tapers toward the inside of the tank, in order to form an abutment for a portion of the seal. While the outer tank wall runs perpendicular or parallel to the common wall of the main passage opening, in the transition area, pronounced shaping is advantageous. A non-rectilinear trajectory can, in whole or in part, be fashioned such that the diameter of the filling level measurement device is tapered in this area. For example, a recess with an increased diameter may be formed in the filling level measurement device in this area, in order, also, to provide an abutment function between the larger diameter dog pressing in the seal and the wall. With this structure, when the filling level measuring device is inserted into the passage opening, the sealing element can be installed in the recess, and then be inserted together with the filling level measurement device. In addition, the recess elevates the deforming pressure on the sealing element, for the purpose of pushing or pressing it into the clearance area while it is being secured in place. Suitable recesses as are depression-shaped, or follow a trajectory that is at least partially arc-shaped, and recesses adapted in particular to the typical shape of an O-ring as the standard sealing element, are particularly advantageous.

The passage opening on the tank is fashioned to good advantage in the form of a typical flange, which partially protrudes out of the tank. This permits stable securing and fastening of the filling level measurement device using the flange on the tank. A welded flange, which is welded into a corresponding opening in the tank wall, is advantageously introduced into the tank so as to constitute the smoothest possible surface inside the tank's filling area. The inside welded seam is advantageously smoothed and polished, as are all other welded seams inside the tank.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIGS. 3A, 3B and 3C show cutouts from the transitional area between the filling level measurement device and the tank wall for the purpose of illustrating various configurations of the transitional area in the interior area of the tank.

DETAILED DESCRIPTION OF SPECIFIC EMBODIMENTS

Figure 1:
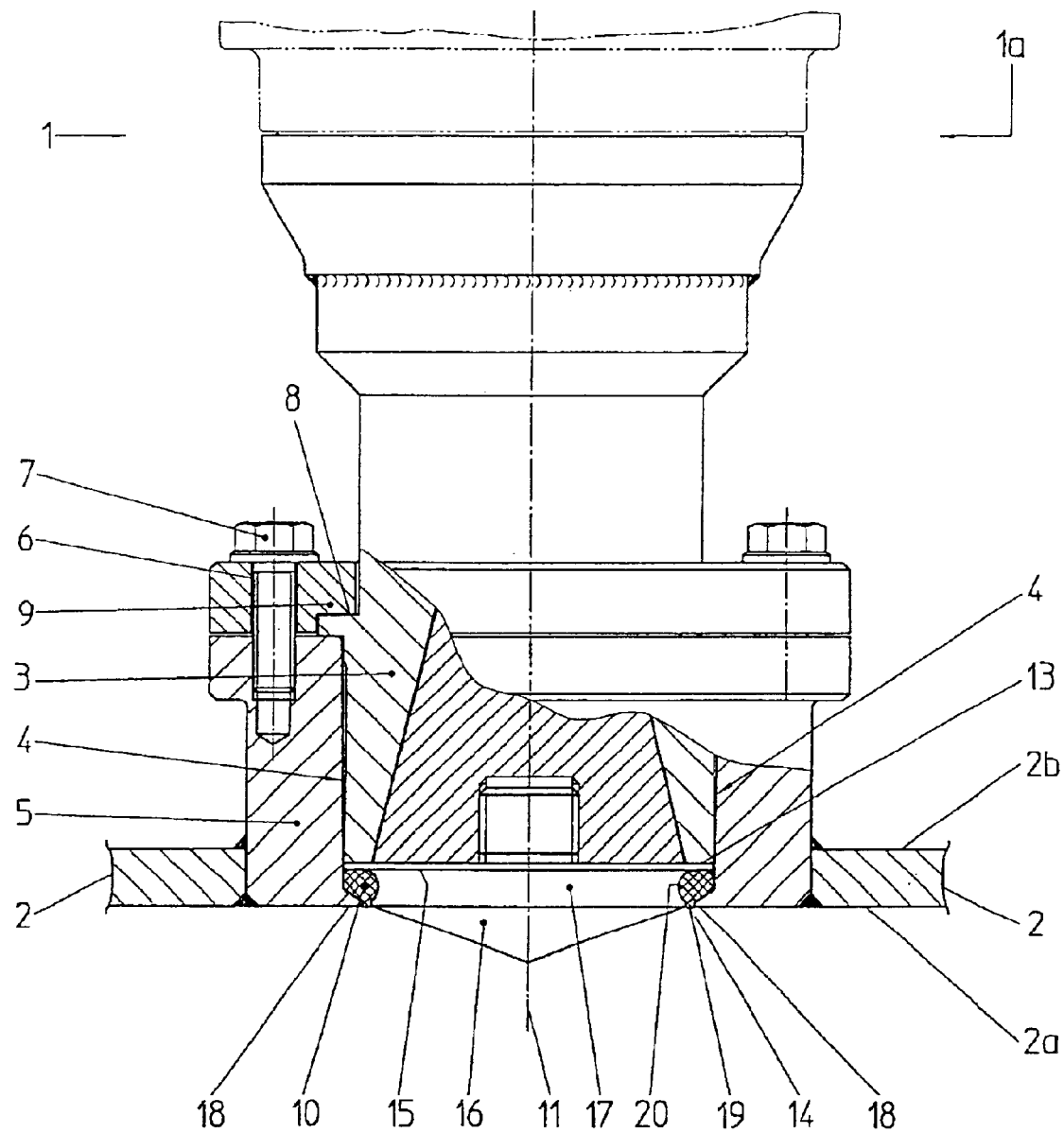
FIG. 1 shows a section through the filling level measurement device, which is built into a tank.

As one can see from the representation in section of FIG. 1, one arrangement consists of a filling level measurement device 1 and a tank 2, into whose wall the filling level measurement device 1 is introduced, having numerous components, of which, however, only those structural elements essential to understanding are described below. Alternatives of various types, only some of which will be alluded to as examples in the following, will be recognizable to the person of ordinary skill.

In the case of the depicted embodiment, filling level measurement device 1 is a radar filling level measurement device, and exhibits radar electronics 1a in the back or outside section accordingly. Taking radar electronics 1a as a point of departure, a measuring device connector 3, with additional measuring device components, extends in the customary manner toward the interior space of tank 2. The front section of measurement device connector 3 protrudes into a passage opening 4, which is incorporated into the wall of tank 2.

To render possible a stable acceptance of measurement device 1, in particular the filling level measurement device, in passage opening 4, a flange 5 is fashioned in the wall of tank 2. The flange protrudes from the tank, preferably toward the outside, so as to form passage opening 4 with a larger guidance and contact surface.

In addition, flange 5 serves to attach filling level measurement device 1 to tank 2. In the case of the depicted embodiment, flange 5 exhibits a threaded borehole 6 in its outer circumferential area, into which a tension screw 7 can be screwed for the purpose of securing the filling level measurement device 1. In its outer circumference, for example, filling level measurement device 1 exhibits one or more measurement device clamping dogs 8, which are covered by a gripping collar 9, such that gripping collar 9 is attached to flange 5 by means of tension screw 7. Depending upon the thickness of the seal 10 and/or the length of measurement device connector 3 relative to the position of measurement device clamping dog 8 on the circumferential wall, measurement device clamping dog 8 can serve simultaneously as the stop for a desired final position, as shown in exemplary fashion by measurement device clamping dog 8, which abuts flange 5.

In the depicted embodiment, flange 5 is welded into the wall of tank 2. This renders a particularly smooth surface possible in the area of the inside of the tank 2a, because after welding flange 5 to the wall of tank 2, smoothing and polishing can be undertaken.

Figure 2:
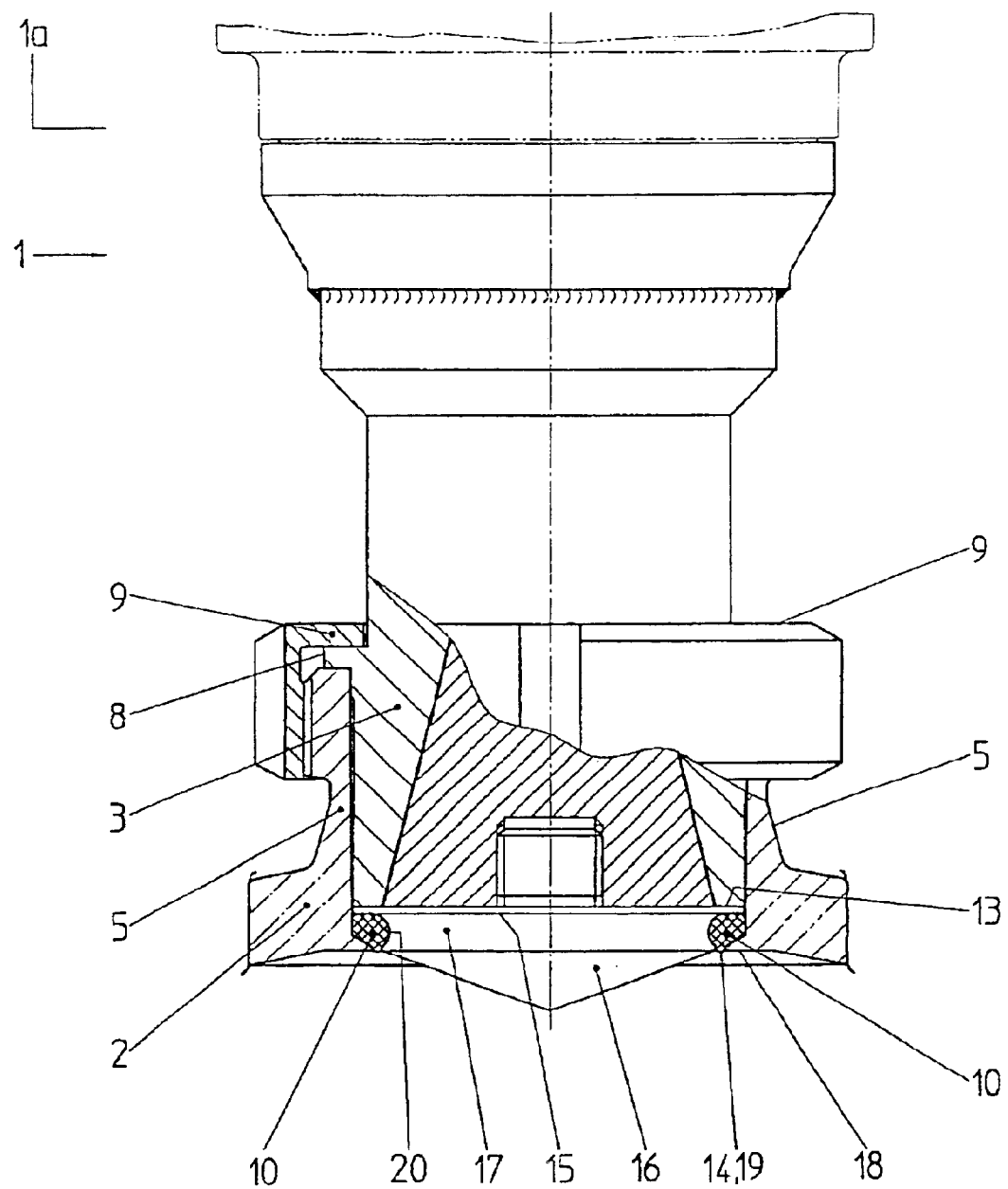
FIG. 2 shows a variant of such an arrangement of a filling level measurement device and a tank.

Other embodiments are also possible, however, as depicted in FIG. 2, for example. There a measurement device connector 3 exhibits a measurement device clamping dog 8, which is tightened against flange 5 by a gripping collar 9, whereby flange 5 exhibits external threading and a portion of gripping collar 9 exhibits internal threading that engages this external threading during assembly. In the case of the embodiment depicted in FIG. 2, flange 5 is fashioned simultaneously as an integral component of the tank wall.

The inside of passage opening 4 and the outside of filling level measurement device 1 exhibit, in the transitional area, or the area of tank 2 adjacent to the inside 2a, special shaping to accommodate one or more sealing elements. This serves to render possible a particularly stable mounting for filling level measurement device 1 in passage opening 4, whereby a smooth surface of the inside of the tank is simultaneously rendered possible, even in the transitional area toward the front of filling level measurement device 1. In particular, a seal 10 in the form of an O-ring that is substantially the type that is commonly commercially available can be used.

Figure 3A:
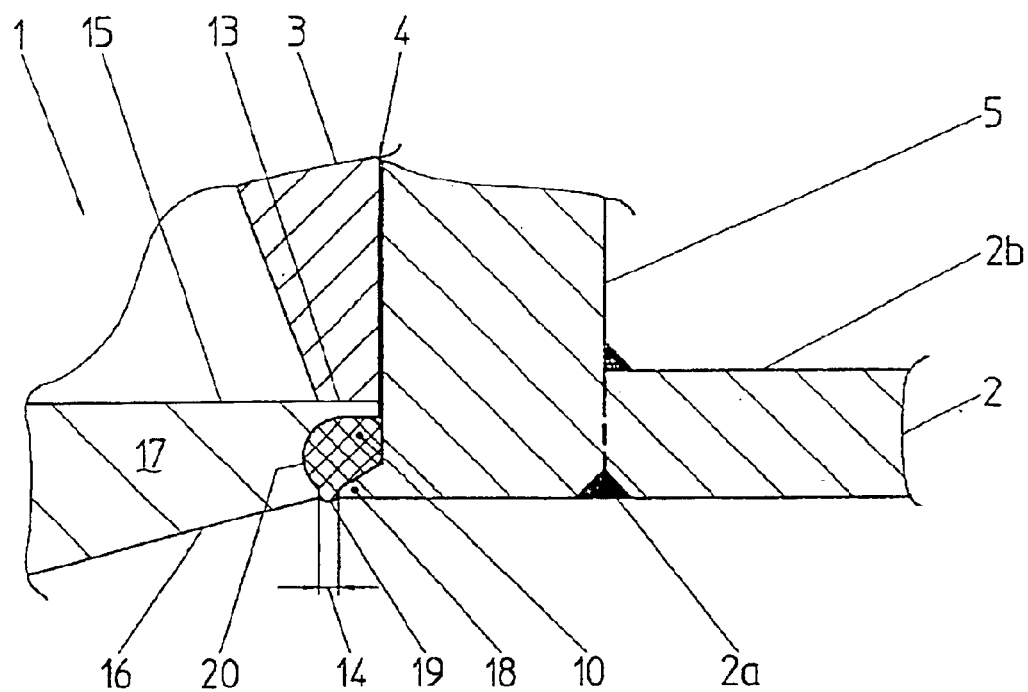

In the case of the embodiment depicted in FIG. 1, of which FIG. 3A shows an enlarged cut-out representation, the inner wall of passage opening 4 is fashioned in such a manner that it runs toward the inside of the tank 2a, in a direction parallel to central axis 11, through passage opening 4. That is, passage opening 4 tapers while forming an opening wall 18 that protrudes into the passage opening in the direction of the inside of the tank 2a. In other words, flange 5 widens into passage opening 4 toward the inside of the tank 2a, for example in the form of a small canopy.

The inclination or steepness of the wall 18, which protrudes into passage opening 4 toward the inside of the tank 2a, is given such dimensions that an abutment is fashioned for a seal 10 that is clamped between this wall 18 and a dog 13 of the filling level measurement device 1. In addition, the inclination is selected in such a manner that the seal 10 that is pressed against this wall is pressed in the direction of a clearance area 14 in the form of a gap fashioned between the inside wall of passage opening 4 in the vicinity of the inside of the tank 2a and the outer circumference of the filling level measurement device there.

Filling level measurement device 1 exhibits in its front section in the transitional area toward the inside of the tank 2a a circumference that is fashioned in such a way as to be narrower than the width of passage opening 4 there. A clearance area 14 is formed by these means.

At a distance from the inside of the tank 2a, the filling level measurement device 1 exhibits one or more dogs 13 for seal 10. Dog 13 can be fashioned, for example, as an integral component of the antenna cone 16 made of Teflon, for example, as the actual front of measurement device connector 3, as a separating or transition element 15 to an antenna cone 16, or as a base of antenna cone 17. The dog or dogs, 13, respectively, the circumferential wall of the filling level measurement device 1 in front of it/them, of cone dog point 17, or of the antenna cone, as well as the inside wall of the passage opening 4 and of the section of opening wall 18 protruding into the latter, fashion a space for accommodating seal 10.

When inserting filling level measurement device 1 into passage opening 4, the seal 10 found in this area is clamped in and pushed or pressed by seal dog 13 in the direction of the inside of the tank 2a and opening wall 18, protruding into passage opening 4. In particular, as a result of the inclination of opening wall 18 of flange 5, too, which protrudes into passage opening 4 or that of the tank wall of tank 2, seal 10 is pressed into the clearance area between opening wall 18 protruding into passage opening 4 and the outer circumference of the filling level measuring device, situated in front of base of antenna cone 17. In a preferred embodiment, seal 10 is pressed not only into clearance area 14, but as far as the inside of the tank 2a, or preferably so that it bulges slightly (19) into the interior space of tank 2.

FIG. 1 and FIG. 3A show a particularly preferred embodiment of the transitional area toward the inside of the tank 2a. There, opening wall 18 protruding into passage opening 4, protrudes obliquely in the direction of the clearance area 14 so that the protruding opening wall 18 serves simultaneously as an abutment and guiding element for the seal pressed onto it.

The external circumference of the filling level measurement device in this area, situated in front of the base of antenna cone 17, exhibits a recess 20. The depicted recess 20 is fashioned, in the preferred embodiment, in a concavely rounded manner, for example, one radius larger than a radius for the purpose of using a typical O-ring as seal 10. Due to the shape of the recess 20, a sealing ring is pressed through the section of recess 20 that is turned away from the inside of the tank toward the protruding opening wall 18 of flange 5 and is guided and pressed through the section of recess 20 that runs obliquely lateral toward the inside of the tank 2a in the direction of clearance area 14.

As one can see from the enlarged representation of FIG. 3A, sharp edges in the transition area are preferably avoided, because due to a rounded trajectory of the individual walls and transition areas, sharp edged trajectories that could possibly damage seal 10 are avoided. Such damage, which would not usually be critical, would lead to a rough surface on the portion of seal 10 that is open toward the interior space of tank 2 and develop points of attachment to which portions of the filling medium could adhere firmly.

Additional variants on the configuration of the transitional area may be seen from FIGS. 3B and 3C. In the case of the variant from FIG. 3B, the circumferential wall of base of antenna cone 17 runs to dog 13 with smooth walls and in rectilinear fashion. In this embodiment, seal 10 is, nevertheless, pressed into clearance area 14 by the pressure of the dog 13 and the corresponding guidance of opening wall 18 protruding into passage opening 4. In the case of this embodiment and of the other embodiments as well, that portion of seal 10 which is pressed into clearance area 14 in a deformed state causes a smooth, especially a gap-free, continuous surface to the front of filling level measurement device 1 facing the inside of the tank 2a, situated in front of the antenna cone 16. In addition, that portion of seal 10 which is pressed into clearance area 14 causes a lateral stabilization which grips base of antenna cone 17 thereby gripping filling level measurement device 1 in the front section, in a plane of the inside of the tank 2a in an axially and laterally/radially stable manner, and centers it in the opening.

In the case of the embodiment depicted in FIG. 3B, opening wall 18 protruding into passage opening 4 is, in addition, fashioned with a continually rounded trajectory.

As may be seen from FIG. 3C, however, embodiments may also be implemented in which the circumferential wall of base of antenna cone 17 is also fashioned to follow a tapering trajectory. In addition to these depicted embodiments, any others that may be desired, especially walls that follow a wavy trajectory and the like, may be implemented.

Recess 20 in the front circumferential section of filling level measurement device 1, situated in front of base of antenna cone 17, can be formed directly during production of the corresponding structural element or be fashioned at a later point in time as a milling, turning, or the like. The entire arrangement is given such dimensions, preferably, that when using a standardized seal 10 and tightening filling level measurement device 1 firmly onto flange 5, pressure is exerted upon seal 10 such that the latter is pressed in a defined manner into the annular gap or clearance area 14 between flange 5 and antenna cones 16, 17, thereby creating a seal radially and axially, and preferably fixing antenna cone 16, 17 in its position. The defined deformation of seal 10 in clearance area 14 thus assures a gap-free transition between flange 5 of tank 2 on the one hand, and the antenna cone 16 of the filling level measurement device 1 on the other hand, which is necessary or desired for use in a sterile environment.

If filling level measurement device 1 is a radar filling level measurement device, the antenna cone 16, 17 is advantageously made of a dielectric material, e.g. ceramic or plastic, and, as a result of a very flat conical form, it renders a very good cleaning possible, which may be performed automatically, with a spray head, for example.

The use of non-standardized seals 10 is also possible, although then, for example, due to the tightening force that is applied for various types of seals, instructions can be given in each case so that the bulging of the seal into the interior space of tank 2 need not always be checked to determine whether the gripping pressure and the gripping depth have been adequately selected, which is labor-intensive.

The individual elements cited above, which are arranged from the outside of the tank (2b) to the inside of the tank (2a) in the transitional area with the seal (10), run preferably in the form of a circle so that a filling level measurement device fashioned with a circular cross-section employing an O-ring as seal 10 can be introduced into the connectors or the flange (5) respectively. Especially the dogs 13, but other guiding elements too, need not follow a continuously circular trajectory, but can also be fashioned as individual elements set off from each other, so that dogs and the like may consist of at least one structural component, but also, possibly, of several structural components.

The process method or design, respectively, can also be transferred to other devices to be introduced into a tank or into a wall.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A process for introducing a filling level measurement device in a tank whose level of filling with a filling medium is to be measured, comprising
    providing a tank with a passage opening leading from outside the tank through the wall of the tank to the inside of the tank, the passage opening comprising an opening wall protruding into the passage toward the inside of the tank, which at least partially tapers toward the inside of the tank,
    introducing a seal into the passage opening of the tank and the filling level measurement device,
    providing a filling level measurement device having a dog fashioned at least in part on the perimeter of the filling level measurement device on the tank side,
    introducing the filling level measurement device into the passage opening from the outside of the tank, until a portion of the filling level measurement device protrudes through the passage opening wall, leaving a clearance area between the protruding portion of the filling level measurement device and the opening wall, and
    with the dog of the filling level measurement device, pressing the seal in the direction of the inside of the tank, against the opening wall and into the clearance area.

2. The process according to claim 1 in which the seal is pressed, in a deforming manner, into the clearance area, bulging forth in part into the interior space of tank.

3. A filling level measurement device for installation in a tank opening having a passage opening wall leading from the outside of the tank to the inside of the tank which at least partially tapers toward the inside of the tank, the filling level measurement device comprising
    a portion fittable through the passage opening wall, the fittable portion leaving a clearance area between the fittable portion and the opening wall, and
    a dog fashioned at least in part on the perimeter of the filling level measurement device adjacent the fittable portion to press and deform a seal in the direction of the inside of the tank against the opening wall and into the clearance area.

4. The filling level measurement device of claim 3, wherein the perimeter of the filling level measurement device adjacent to the fittable portion and dog further includes a contour that is not parallel to a longitudinal axis of the passage opening, for the purpose of guiding the seal.

5. The filling level measurement device of claim 3, wherein the filling level measurement device has an increasing circumference adjacent to the fittable portion and dog, for the purpose of guiding the seal to the clearance area.

6. The filling level measurement device of claim 3, wherein the filling level measurement device has a depression about its circumference adjacent to the fittable portion and dog, forming a recess for the purpose of guiding the seal.

7. The filling level measurement device of claim 3, wherein the filling level measurement device has a circumferential area adjacent to the fittable portion and dog which runs, at least in part, in the form of an arc toward the inside of the tank and the clearance area, for the purpose of guiding the seal.

8. A tank opening for accommodating a filling level measurement device, comprising
    a passage opening between the outside of the tank and the inside of the tank sized for insertion of a filling level measuring device and a seal,
    wherein the passage opening has, toward the inside of the tank, an opening wall protruding into the passage opening which at least partially tapers toward the inside of the tank
    a filling level measurement device installed in the tank opening,
    the filling level measurement device comprising
    a portion fittable through the passage opening wall, the fittable portion leaving a clearance area between the fittable portion and the opening wall, and
    a dog fashioned at least in part on the perimeter of the filling level measurement device adjacent the fittable portion,
    wherein the inside wall of the tank and the inside end of the filling level measurement device lie substantially in one plane.

9. A tank opening for accommodating a filling level measurement device, comprising
    a passage opening between the outside of the tank and the inside of the tank sized for insertion of a filling level measuring device and a seal,
    wherein the passage opening has, toward the inside of the tank, an opening wall protruding into the passage opening which at least partially tapers toward the inside of the tank
    a filling level measurement device and seal installed in the tank opening,
    the filling level measurement device comprising
    a portion fittable through the passage opening wall, the fittable portion leaving a clearance area between the fittable portion and the opening wall, and
    a dog fashioned at least in part on the perimeter of the filling level measurement device adjacent the fittable portion,
    wherein the dog presses and deform the seal in the direction of the inside of the tank against the opening wall and into the clearance area, bulging partially out of clearance area, into the interior space of the tank.

* * * * *